(12) United States Patent
Uhm et al.

(10) Patent No.: US 10,615,458 B2
(45) Date of Patent: Apr. 7, 2020

(54) APPARATUS AND METHOD FOR MANUFACTURING CABLE-TYPE SECONDARY BATTERY AND CABLE-TYPE SECONDARY BATTERY MANUFACTURED BY THE SAME

(71) Applicant: LG Chem, Ltd., Seoul (KR)

(72) Inventors: In-Sung Uhm, Daejeon (KR); Yo-Han Kwon, Daejeon (KR); Je-Young Kim, Daejeon (KR); Suk-In Noh, Daejeon (KR); Dong-Chan Lee, Daejeon (KR)

(73) Assignee: LG Chem, Ltd. (KR)

( * ) Notice: Subject to any disclaimer, the term of this patent is extended or adjusted under 35 U.S.C. 154(b) by 234 days.

(21) Appl. No.: 15/765,932

(22) PCT Filed: Jan. 9, 2017

(86) PCT No.: PCT/KR2017/000286
§ 371 (c)(1),
(2) Date: Apr. 4, 2018

(87) PCT Pub. No.: WO2017/119799
PCT Pub. Date: Jul. 13, 2017

(65) Prior Publication Data
US 2018/0287212 A1    Oct. 4, 2018

(30) Foreign Application Priority Data
Jan. 7, 2016    (KR) ........................ 10-2016-0002252

(51) Int. Cl.
*H01M 10/0587* (2010.01)
*H01M 2/18* (2006.01)
(Continued)

(52) U.S. Cl.
CPC ......... *H01M 10/0587* (2013.01); *B21C 47/02* (2013.01); *B65H 54/44* (2013.01);
(Continued)

(58) Field of Classification Search
CPC ............. H01M 10/0587; H01M 10/04; H01M 10/058; H01M 4/13; H01M 10/0409;
(Continued)

(56) References Cited

U.S. PATENT DOCUMENTS

2005/0115738 A1   6/2005 Yamaguchi et al.
2007/0246242 A1   10/2007 Iwasaki et al.
(Continued)

FOREIGN PATENT DOCUMENTS

EP    1626417 A1    2/2006
KR    100626245 B1    9/2006
(Continued)

OTHER PUBLICATIONS

Search report from International Application No. PCT/KR2017/000286, dated Apr. 18, 2017.
(Continued)

*Primary Examiner* — Stewart A Fraser
(74) *Attorney, Agent, or Firm* — Lerner, David, Littenberg, Krumholz & Mentlik, LLP (57) ABSTRACT

Disclosed is a method for manufacturing a cable-type secondary battery, which includes successively supplying a first electrode member, a separator ribbon and a second electrode member around a rod-shaped winding core, wherein a width of the first electrode member and a width of the second electrode member are respectively smaller than a winding circumference, and a width of the separator ribbon is greater than the winding circumference.

20 Claims, 3 Drawing Sheets

(51) Int. Cl.
*H01M 10/04* (2006.01)
*B21C 47/02* (2006.01)
*B65H 54/44* (2006.01)
*H01M 4/13* (2010.01)
*H01M 10/058* (2010.01)
*B65H 55/00* (2006.01)

(52) U.S. Cl.
CPC ............ *B65H 55/005* (2013.01); *H01M 2/18* (2013.01); *H01M 4/13* (2013.01); *H01M 10/04* (2013.01); *H01M 10/0409* (2013.01); *H01M 10/058* (2013.01)

(58) Field of Classification Search
CPC ....... H01M 2/18; B65H 55/005; B65H 54/44; B21C 47/02
See application file for complete search history.

(56) References Cited

U.S. PATENT DOCUMENTS

| | | | |
|---|---|---|---|
| 2014/0178726 A1 | 6/2014 | Kwon et al. | |
| 2014/0377613 A1 | 12/2014 | Kwon et al. | |
| 2014/0377617 A1 | 12/2014 | Kwon et al. | |
| 2017/0200979 A1 | 7/2017 | Kwon et al. | |
| 2018/0183052 A1* | 6/2018 | Zhamu | ............... H01M 4/38 |

FOREIGN PATENT DOCUMENTS

| | | |
|---|---|---|
| KR | 20130040160 A | 4/2013 |
| KR | 20150051210 A | 5/2015 |
| KR | 101542097 B1 | 8/2015 |
| KR | 20150146433 A | 12/2015 |
| KR | 20160125180 A | 10/2016 |

OTHER PUBLICATIONS

Extended European Search Report for Application No. EP17736171 dated May 23, 2018.
Hyeokjo Gown et al., "Recent progress on flexible lithium rechargeable batteries", Energy & Environmental Science, Jan. 1, 2014, vol. 7, No. 2, pp. 538-551, Cambridge, XP55473895.

* cited by examiner

APPARATUS AND METHOD FOR MANUFACTURING CABLE-TYPE SECONDARY BATTERY AND CABLE-TYPE SECONDARY BATTERY MANUFACTURED BY THE SAME

CROSS-REFERENCE TO RELATED APPLICATIONS

The present application is a national phase entry under 35 U.S.C. § 371 of International Application No. PCT/KR2017/000286, filed Jan. 9, 2017, published in Korean, which claims priority to Korean Patent Application No. 10-2016-0002252 filed on Jan. 7, 2016 in the Republic of Korea, the disclosures of which are incorporated herein by reference.

The present disclosure relates to a cable-type secondary battery, and more particularly, to an apparatus and method for manufacturing a cable-type secondary battery, which is configured to automatically manufacture a cable-type secondary battery, and a cable-type secondary battery manufactured by the same.

BACKGROUND ART

A lithium secondary battery has many advantages such as relatively high energy density, high operation voltage, excellent preservation and long life span, and thus the lithium secondary battery is widely used for various portable electronic devices such as personal computers, camcorders, cellular phones, portable CD players, PDA or the like.

Generally, a lithium secondary battery includes a cylindrical or rectangular case and an electrode assembly accommodated in the case together with an electrolyte. Here, the electrode assembly is prepared by stacking a positive electrode, a separator and a negative electrode and generally has a jelly-roll wound structure or a stacked structure.

Also, recently, a cable-type secondary battery which may be freely modified and thus applicable to various fields has been proposed. The cable-type secondary battery is an elongated battery having a great length in comparison to its diameter and includes a hollow anode layer, a separator surrounding the anode layer, and a cathode layer surrounding the separator.

Korean unexamined patent publication No. 2013-0040160 discloses a technique related to the cable-type secondary battery.

Korean unexamined patent publication No. 2013-0040160 discloses a cable-type secondary battery, which is elongated in a length direction with a horizontal section of a predetermined shape and includes a lithium ion supplying core containing an electrolyte, an inner electrode formed to surround an outer surface of the lithium ion supplying core and having a spiral electrode prepared by spirally twisting two wire-type current collectors having an inner electrode active material coated thereon, a separator layer formed to surround an outer surface of the inner electrode to prevent a short circuit of the electrode, and an outer electrode formed to surround an outer surface of the separator layer and having an outer electrode active material and an outer current collector.

However, the cable-type secondary battery may not be easily mass-produced since there is no technique for automatically assembling the inner electrode, the separator and the outer electrode, and there is needed a countermeasure against this.

DISCLOSURE

Technical Problem

The present disclosure is designed to solve the problems of the related art, and therefore the present disclosure is directed to providing an apparatus and method for manufacturing a cable-type secondary batter, which may automate a cable-type secondary battery assembling process by successively twisting an inner electrode, a separator and an outer electrode of the cable-type secondary battery, and also directed to providing a cable-type secondary battery manufactured by the same.

Technical Solution

In one aspect of the present disclosure, there is provided an apparatus for manufacturing a cable-type secondary battery, comprising: a rod-shaped winding core; and a battery element supply unit having a first electrode bobbin configured to successively supply a first electrode member, a separator bobbin configured to successively supply a separator ribbon, and a second electrode bobbin configured to successively supply a second electrode member, wherein at least one of the winding core and the battery element supply unit is rotated to twist the first electrode member, the separator ribbon and the second electrode member in order on a circumference of the winding core along a length direction of the winding core.

The apparatus for manufacturing a cable-type secondary battery according to the present disclosure may further comprise a support installed to be rotatable based on an axis coinciding with an axis of the winding core, wherein a plurality of first electrode bobbins may be arranged at regular intervals to surround the winding core and rotatably mounted to the support, respectively.

The separator bobbin and the second electrode bobbin may be mounted to a common rotating frame, which is installed to be rotatable based on an axis coinciding with the axis of the winding core, to rotate integrally.

The separator bobbin and the second electrode bobbin may be respectively installed to adjust a winding angle with respect to the winding core.

The apparatus for manufacturing a cable-type secondary battery according to the present disclosure may further comprise a first support rod configured to support the separator bobbin and a second support rod configured to support the second electrode bobbin, wherein the first support rod and the second support rod may be respectively installed at the common rotating frame to be pivotal for angle adjustment based on each pivotal portion.

The separator bobbin and the second electrode bobbin may be respectively mounted to a first rotating rod and a second rotating rod, which are installed to be rotatable based on an axis coinciding with an axis of the winding core, to rotate independent from each other.

The first electrode member may have a structure in which a wire is coated with a negative electrode active material for a secondary battery.

The second electrode member may have a strip structure.

A width of the first electrode member and a width of the second electrode member may be respectively smaller than a winding circumference, and a width of the separator ribbon may be greater than the winding circumference.

When the winding core has a circular section, the widths (W) of the first electrode member and the second electrode member may respectively satisfy the following equation:

$W<D\times\pi$ ($D$:winding inner diameter,$\pi$:circular constant).

When the winding core has an oval section, the widths (W) of the first electrode member and the second electrode member may respectively satisfy the following equation:

$W<L$ ($L$:winding circumference).

When the separator ribbon is wound to overlap into two layers, the width (W) of the separator ribbon may satisfy the following equation:

$W>2D\times\pi$ ($D$:winding inner diameter,$\pi$:circular constant).

The first electrode member may have a width of 0.4 to 0.5 mm, the separator ribbon may have a width of 7 mm or below, and the second electrode member may have a width of 3 mm or below.

The separator ribbon may be twisted to overlap 50% or below of the entire width.

In another aspect of the present disclosure, there is also provided a method for manufacturing a cable-type secondary battery, comprising: (a) disposing a first electrode bobbin configured to successively supply a first electrode member, a separator bobbin configured to successively supply a separator ribbon, and a second electrode bobbin configured to successively supply a second electrode member, around a rod-shaped winding core; (b) rotating the first electrode bobbin based on an axis coinciding with an axis of the winding core to twist the first electrode member of a strip structure at an outside of the winding core; (c) rotating the separator bobbin based on an axis coinciding with an axis of the winding core to twist the separator ribbon at an outside of the first electrode member; and (d) rotating the second electrode bobbin based on an axis coinciding with an axis of the winding core to twisting the second electrode member of a strip structure at an outside of the separator ribbon, wherein a width of the first electrode member and a width of the second electrode member are respectively smaller than a winding circumference, and a width of the separator ribbon is greater than the winding circumference.

In another aspect of the present disclosure, there is also provided a cable-type secondary battery manufactured by the method.

Advantageous Effects

According to the present disclosure, since an automation system capable of automatically assembling a cable-type secondary battery while successively supplying a negative electrode wire material, a separator ribbon and a positive electrode wire material for forming a cable-type secondary battery is constructed, productivity for the cable-type secondary battery is improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
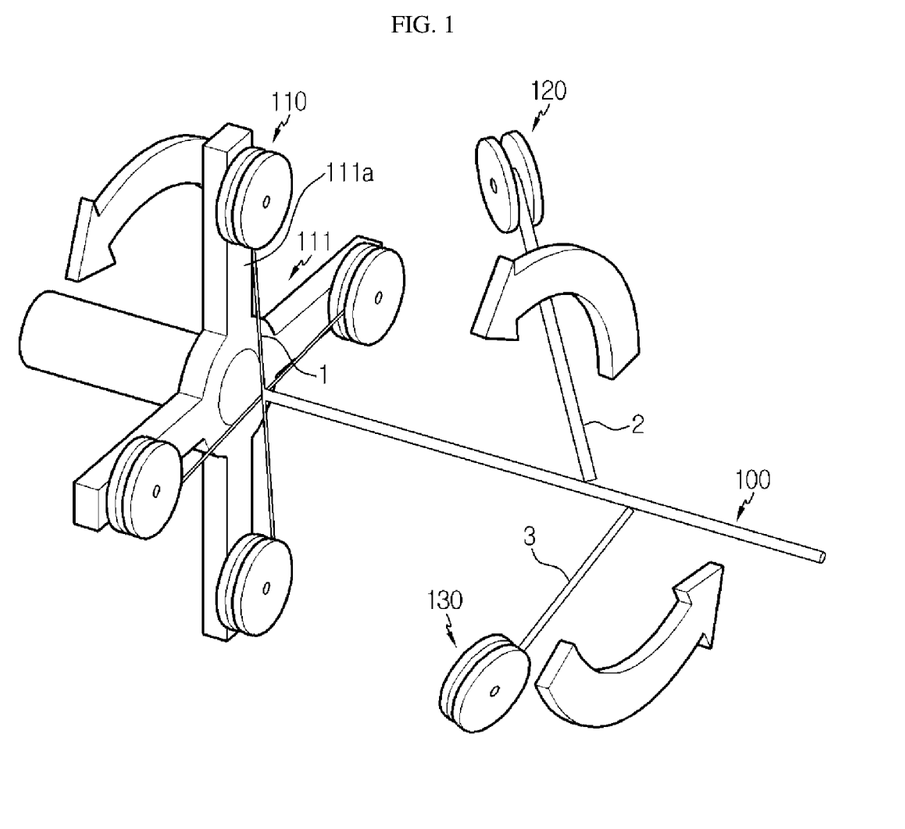
FIG. 1 is a perspective view schematically showing main components of an apparatus for manufacturing a cable-type secondary battery according to the present disclosure.

FIG. 1 is a perspective view schematically showing main components of an apparatus for manufacturing a cable-type secondary battery according to the present disclosure.

Referring to FIG. 1, the apparatus for manufacturing a cable-type secondary battery includes a rod-shaped winding core 100, and a battery element supply unit for supplying a first electrode member 1, a separator ribbon 2 and a second electrode member 3 to the winding core 100. The battery element supply unit includes a first electrode bobbin 110 for successively supplying the first electrode member 1, a separator bobbin 120 for successively supplying the separator ribbon 2, and a second electrode bobbin 130 for successively supplying the second electrode member 3.

The winding core 100 may be implemented with a rod of a given length and diameter. Since the winding core 100 is configured with a rod having a small diameter of, for example, 0.5 mm, the winding core 100 may be supported in contact with a predetermined support structure coated with a polymer in order to prevent the winding core 100 from being bent due to a tension of the wire material during a twisting process.

The first electrode bobbin 110 is a bobbin on which the first electrode member 1 used to form an inner electrode of a cable-type secondary battery is wound. The first electrode member 1 is made of a copper wire coated with a common negative electrode active material for a lithium secondary battery. Preferably, the first electrode member 1 is spirally twisted to provide a negative electrode of a cable-type secondary battery.

A plurality of first electrode bobbins 110 are disposed at predetermined intervals on the support 111 so as to surround the winding core 100 and are rotatably mounted on the support 111 so that the first electrode member 1 may be withdrawn. To this end, the support 111 may be provided with a support arm 111a radially for supporting each first electrode bobbin 110.

The separator bobbin 120 is a bobbin on which a separator ribbon 2 used for forming a separator of a cable-type secondary battery is wound. As the separator ribbon 2, a ribbon-shaped common separator film for a lithium secondary battery may be used.

The second electrode bobbin 130 is a bobbin on which the second electrode member 3 used for forming an outer electrode of the cable-type secondary battery is wound. The second electrode member 3 has a structure in which a common positive electrode active material for a lithium secondary battery is coated on a conductor strip. Preferably, the second electrode member 3 is spirally twisted to provide a positive electrode of a cable-type secondary battery.

The apparatus for manufacturing a cable-type secondary battery operates to twist the first electrode member 1, the separator ribbon 2 and the second electrode member 3 in order around the winding core 100 along the length direction of the winding core 100. For this, the first electrode bobbin 110, the separator bobbin 120 and the second electrode bobbin 130 may be arranged in order along the axial direction of the winding core 100.

The apparatus for manufacturing a cable-type secondary battery twists the first electrode member 1, the separator ribbon 2 and the second electrode member 3 in order around the winding core 100 according to the length direction of the winding core 100 by rotating at least one of the winding core 100 and the battery element supply unit. Hereinafter, the present disclosure will be described based on the case where the winding core 100 does not rotate but the battery element supply unit rotates to manufacture a cable-type secondary battery.

Figure 2:
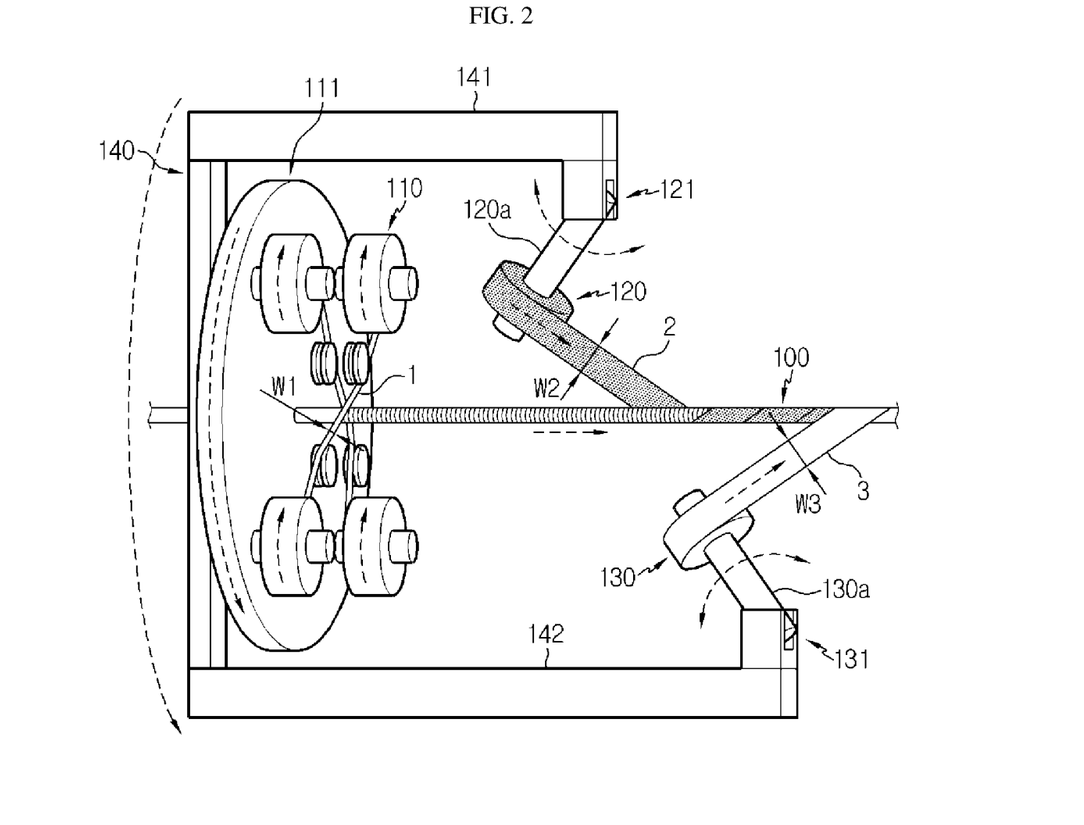
FIG. 2 is a perspective view showing an apparatus for manufacturing a cable-type secondary battery according to an embodiment of the present disclosure.

According to an embodiment of the present disclosure, as shown in FIG. 2, the apparatus for manufacturing a cable-type secondary battery includes a support 111 installed to be rotatable based on an axis coincident with the winding core 100 to support the first electrode bobbin 110 and a common rotating frame 140 configured to collectively support the separator bobbin 120 and the second electrode bobbin 130. In this embodiment, the winding core 100 is installed to be movable forwards and rearwards along the axial direction.

The support 111 is configured to have a substantially disc-shaped body and plays a role of twisting the first electrode member 1 around the winding core 100 by supporting the first electrode bobbin 110 and rotating the first electrode bobbin 110 around the winding core 100. Here, the winding core 100 may be disposed to pass through the center of the support 111.

The common rotating frame 140 plays a role of twisting the separator ribbon 2 and the second electrode member 3 around the winding core 100 by supporting the separator bobbin 120 and the second electrode bobbin 130 and integrally rotating the separator bobbin 120 and the second electrode bobbin 130 around the winding core 100. At this time, the separator bobbin 120 and the second electrode bobbin 130 are rotatably mounted to the common rotating frame 140 so that the separator ribbon 2 and the second electrode member 3 may be wound out.

On the common rotating frame 140, the separator bobbin 120 and the second electrode bobbin 130 are arranged at a certain distance from each other in the axial direction of the winding core 100. In addition, the separator bobbin 120 and the second electrode bobbin 130 are installed at the common rotating frame 140 so as to be positioned opposite to each other with respect to the winding core 100. For this purpose, a first frame 141 and a second frame 142 of a predetermined shape are provided at both sides of the common rotating frame 140 to support the separator bobbin 120 and the second electrode bobbin 130.

Since the separator bobbin 120 and the second electrode bobbin 130 rotates integrally around the winding core 100 by the common rotating frame 140, their angles winding around the winding core 100, namely winding angles, may be independently controlled. To this end, a first support rod 120a supporting the separator bobbin 120 and a second support rod 130a supporting the second electrode bobbin 130 are respectively installed at the first frame 141 and the second frame 142 so as to be pivoted by different pivotal portions 121 and 131 for angle adjustment.

As the support 111 and the common rotating frame 140 are rotated, the apparatus for manufacturing a cable-type secondary battery as configured above twists the first electrode member 1, the separator ribbon 2, and the second electrode member 3 in order around the moving winding core 100 which is moving in an axial direction, while the first electrode bobbin 110, the separator bobbin 120 and the second electrode bobbin 130 rotate along the circumference of the winding core 100. Accordingly, the battery elements are twisted along the length direction around the winding core 100, and a winding cell laminated in the radial direction is formed. The winding cell manufactured as above is cut into a predetermined length and then separated and taken out in the axial direction from the winding core 100.

Figure 3:
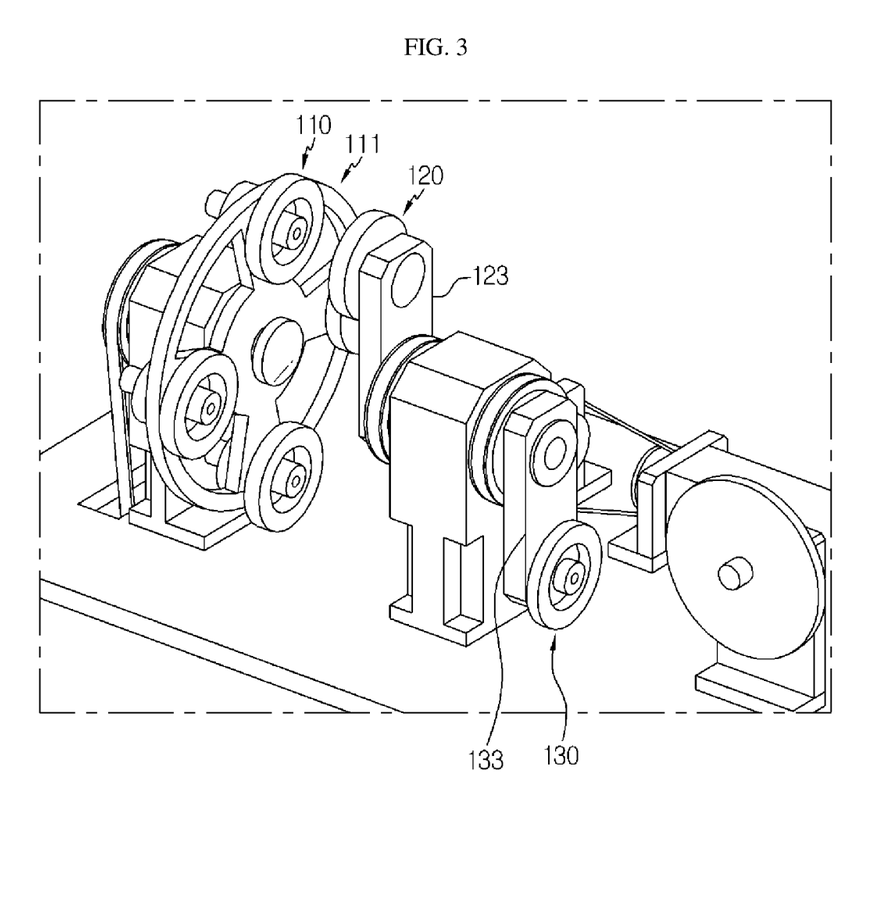
FIG. 3 is a perspective view showing an apparatus for manufacturing a cable-type secondary battery according to another embodiment of the present disclosure.

According to another embodiment of the present disclosure, as shown in FIG. 3, the apparatus for manufacturing a cable-type secondary battery includes a support 111 installed to be rotatable about an axis coinciding with the axis of the winding core 100 to support the first electrode bobbin 110, and a first rotating rod 123 and a second rotating rod 133 configured to support the separator bobbin 120 and the second electrode bobbin 130, respectively. In this embodiment, the winding core 100 maintains a fixed state so as not to move in the axial direction.

The separator bobbin 120 and the second electrode bobbin 130 are mounted at the ends of the first rotating rod 123 and the second rotating rod 133, which are individually rotatable about a rotation axis coinciding with the axis of the winding core 100, to rotate independently of each other.

In the apparatus for manufacturing a cable-type secondary battery as configured above, as the support 111, the first rotating rod 123 and the second rotating rod 133 rotate, the first electrode bobbin 110, the separator bobbin 120 and the second electrode bobbin 130 rotate around the winding core 100 and twist the first electrode member 1, the separator ribbon 2 and the second electrode member 3 around the winding core 100 in order. Accordingly, the battery elements are twisted along the length direction around the winding core 100, and a winding cell laminated in the radial direction is formed. After the winding cell is formed, the winding core 100 is removed from the winding cell to obtain a cable-type secondary battery.

The width of the first electrode member 1 and the width of the second electrode member 3 of the battery elements spirally wound on the winding core 100 are smaller than the winding circumference of the corresponding battery elements, and the width of the separator ribbon 2 is designed to be larger than the winding circumference thereof. Here, the 'width' refers to a maximum distance across each battery element perpendicular to its length direction. The 'winding circumference' refers to a circumferential length measured in a direction perpendicular to the length direction of the winding core 100 in a state where the corresponding battery element is spirally wound on the outside of the winding core 100.

When the winding core 100 has a circular cross section, the first electrode member 1 and the second electrode member 3 are each designed to satisfy the relationship $W<D\times\pi$. Here, W is the width of each battery element, D is the winding inner diameter of each battery element, and $\pi$ is a circular constant. More specifically, referring to FIG. 3, the width (W1) of the first electrode member 1 satisfies the relation $W1<D\times\pi$, and the width (W3) of the second electrode member 3 satisfies the relation $W3<D\times\pi$. According to this configuration, the first electrode member 1 and the second electrode member 3 can be efficiently wound spirally around the winding core 100 without overlapping with each other.

For example, when the diameter of the winding core 100 is 0.5 mm, the winding inner diameter of the first electrode member 1 wound immediately at an outer side the winding core 100 is 0.5 mm, so that the width (W1) of the first electrode member 1 is designed to be 1.57 mm (=0.5 mm×3.14) or less.

Assuming that the thickness of the first electrode member 1 is 0.4 mm, the winding inner diameter of the separator ribbon 2 is 1.3 mm (=2×0.4 mm+0.5 mm), the separator ribbon 2 may be wound into a single layer without overlapping if the width W2 of the separator ribbon 2 is 4.082 mm (=1.3 mm×3.14).

In order to prevent a short circuit between the first electrode member 1 and the second electrode member 3, it is optimal to wind the separator ribbon 2 to overlap in two layers at least partially. When separator ribbon 2 is wound to overlap in two layers, the width W2 of separator ribbon 2 is designed to satisfy the formula W>2D×π. Here, D is the winding inner diameter, and π is the circular constant.

For example, if the width W2 of the separator ribbon 2 is designed to be greater than 8.164 mm (=2×1.3 mm×3.14), the separator ribbon 2 may be wound to overlap in two layers.

When the winding core 100 has an oval section, the widths of the first electrode member 1 and the second electrode member 3 among the battery elements spirally wound on the winding core 100 are designed to satisfy the relationship W<L. Here, W is the width of each battery element, and L is the winding circumference of each battery element. More specifically, referring to FIG. 3, the width W1 of the first electrode member 1 satisfies the relation W1<L, and the width W3 of the second electrode member 3 satisfies the relation W3<L.

For efficiently supplying and winding the electrode members 1, 3 and the separator ribbon 2 when the apparatus for manufacturing a cable-type secondary battery is in operation, the width W1 of the first electrode member 1 may be defined as 0.4 to 0.5 mm, the width W2 of the separator ribbon 2 may be defined as 7 mm or less, and the width W3 of the second electrode member 3 may be defined as 3 mm or less.

In order to wind the separator ribbon 2 around the winding core 100 without any gap, the separator ribbon 2 may be twisted so that 50% or less of the total width overlaps. At this time, the winding angle of the separator ribbon 2 may be 21 to 24 degrees, and the winding angle of the second electrode member 3 may be preferably 25 to 28 degrees.

As described above, the apparatus for manufacturing a cable-type secondary battery according to the present disclosure may mass-produce cable-type secondary batteries by automatically performing an assembling process in which the first electrode member 1, the separator ribbon 2 and the second electrode member 3 constituting the cable-type secondary battery are successively supplied to form around the winding core 100 a winding cell in which the inner electrode, the separator and the outer electrode are twisted in order.

According to another embodiment of the present disclosure, there is provided a method for manufacturing a cable-type secondary battery, which includes a process of disposing bobbins serving as a battery element supply unit around a rod-shaped winding core and a process of rotating each bobbin while supplying battery elements so that the first electrode member 1, the separator ribbon 2 and the second electrode member 3 are wound and twisted in order around the winding core 100.

In the process of disposing bobbins, the first electrode bobbin 110, the separator bobbin 120 and the second electrode bobbin 130 are arranged at predetermined angles, respectively. In other words, the first electrode bobbin 110 capable of continuously supplying the first electrode member 1 of a strip structure, the separator bobbin 120 capable of continuously supplying the separator ribbon 2, and the second electrode bobbin 130 capable of continuously supplying the second electrode member 3 of a strip structure are disposed around the winding core 100.

The first electrode member 1, the separator ribbon 2 and the second electrode member 3 are wound around the first electrode bobbin 110, the separator bobbin 120 and the second electrode bobbin 130, respectively, as battery elements. Here, the width of the first electrode member 1 and the width of the second electrode member 3 are set to be smaller than the respective winding circumferences thereof so that the first electrode member 1 and the second electrode member 3 do not overlap when being spirally twisted around the winding core 100 by the twisting process. In addition, the width of the separator ribbon 2 is set to be larger than the winding circumference to cause overlapping occurs when being spirally twisted around the winding core 100 by the twisting process.

In the twisting process, a process of rotating the first electrode bobbin 110 about an axis coinciding with the axis of the winding core 100 to spirally wind and twist the first electrode member 1 having a strip structure around the winding core 100, a process of rotating the separator bobbin 120 about an axis coinciding with the axis of the winding core 100 to spirally wind and twist the separator ribbon 2 to the outside of the first electrode member 1, and a process of rotating the second electrode bobbin 130 about an axis coinciding with the axis of the winding core 100 to spirally wind and twist the second electrode member 3 of a strip structure on the outside of the ribbon 2 are automatically performed in order.

When the method for manufacturing a cable-type secondary battery according to the present disclosure is executed, the numerical ranges of width of each battery element for efficiently supplying and winding the first electrode member 1, the separator ribbon 2 and the second electrode member 3 are identical to those described above, and thus they are not described again in detail.

According to another embodiment of the present disclosure, there is provided a cable-type secondary battery, which is manufactured by the above method so that the first electrode member 1, the separator ribbon 2 and the second electrode member 3 are twisted in order, the battery elements are laminated in the radial direction, and the width of each battery element is within the above numerical range.

INDUSTRIAL APPLICABILITY

If the present disclosure is applied, the cable-type secondary battery may be produced more efficiently by automatizing the process of assembling the cable-type secondary battery.

What is claimed is:

1. An apparatus for manufacturing a cable-type secondary battery, comprising:
   a rod-shaped winding core; and
   a battery element supply unit having a first electrode bobbin configured to successively supply a first electrode member, a separator bobbin configured to successively supply a separator ribbon, and a second electrode bobbin configured to successively supply a second electrode member,
   wherein at least one of the winding core and the battery element supply unit is rotated to twist the first electrode member, the separator ribbon and the second electrode member in order on a circumference of the winding core along a length direction of the winding core.

2. The apparatus for manufacturing a cable-type secondary battery according to claim 1, further comprising:
   a support installed to be rotatable based on an axis coinciding with an axis of the winding core,
   wherein a plurality of first electrode bobbins are arranged at regular intervals to surround the winding core and rotatably mounted to the support, respectively.

3. The apparatus for manufacturing a cable-type secondary battery according to claim 2,
wherein the separator bobbin and the second electrode bobbin are mounted to a common rotating frame, which is installed to be rotatable based on an axis coinciding with the axis of the winding core, to rotate integrally.

4. The apparatus for manufacturing a cable-type secondary battery according to claim 3,
wherein the separator bobbin and the second electrode bobbin are respectively installed to adjust a winding angle with respect to the winding core.

5. The apparatus for manufacturing a cable-type secondary battery according to claim 4, further comprising:
a first support rod configured to support the separator bobbin and a second support rod configured to support the second electrode bobbin,
wherein the first support rod and the second support rod are respectively installed at the common rotating frame to be pivotal for angle adjustment based on each pivotal portion.

6. The apparatus for manufacturing a cable-type secondary battery according to claim 2,
wherein the separator bobbin and the second electrode bobbin are respectively mounted to a first rotating rod and a second rotating rod, which are installed to be rotatable based on an axis coinciding with an axis of the winding core, to rotate independent from each other.

7. The apparatus for manufacturing a cable-type secondary battery according to claim 1,
wherein the first electrode member has a structure in which a wire is coated with a negative electrode active material for a secondary battery.

8. The apparatus for manufacturing a cable-type secondary battery according to claim 7,
wherein the second electrode member has a strip structure.

9. The apparatus for manufacturing a cable-type secondary battery according to claim 8,
wherein a width of the first electrode member and a width of the second electrode member are respectively smaller than a winding circumference, and
wherein a width of the separator ribbon is greater than the winding circumference.

10. The apparatus for manufacturing a cable-type secondary battery according to claim 9,
wherein the winding core has a circular section, and
wherein the widths (W) of the first electrode member and the second electrode member respectively satisfy the following equation:

$W < D \times \pi$ ($D$:winding inner diameter,$\pi$:circular constant).

11. The apparatus for manufacturing a cable-type secondary battery according to claim 9,
wherein the winding core has an oval section, and
wherein the widths (W) of the first electrode member and the second electrode member respectively satisfy the following equation:

$W < L$ ($L$:winding circumference).

12. The apparatus for manufacturing a cable-type secondary battery according to claim 9,
wherein when the separator ribbon is wound to overlap into two layers, the width (W) of the separator ribbon satisfies the following equation:

$W > 2D \times \pi$ ($D$:winding inner diameter,$\pi$:circular constant).

13. The apparatus for manufacturing a cable-type secondary battery according to claim 1,
wherein the first electrode member has a width of 0.4 to 0.5 mm, the separator ribbon has a width of 7 mm or below, and the second electrode member has a width of 3 mm or below.

14. The apparatus for manufacturing a cable-type secondary battery according to claim 13,
wherein the separator ribbon is twisted to overlap 50% or below of the entire width.

15. A method for manufacturing a cable-type secondary battery, comprising:
(a) disposing a first electrode bobbin configured to successively supply a first electrode member, a separator bobbin configured to successively supply a separator ribbon, and a second electrode bobbin configured to successively supply a second electrode member, around a rod-shaped winding core;
(b) rotating the first electrode bobbin based on an axis coinciding with an axis of the winding core to twist the first electrode member of a strip structure at an outside of the winding core;
(c) rotating the separator bobbin based on an axis coinciding with an axis of the winding core to twist the separator ribbon at an outside of the first electrode member; and
(d) rotating the second electrode bobbin based on an axis coinciding with an axis of the winding core to twisting the second electrode member of a strip structure at an outside of the separator ribbon,
wherein a width of the first electrode member and a width of the second electrode member are respectively smaller than a winding circumference, and a width of the separator ribbon is greater than the winding circumference.

16. The method for manufacturing a cable-type secondary battery according to claim 15,
wherein in the step (a), the winding core having a circular section is disposed, and
wherein the widths (W) of the first electrode member and the second electrode member respectively satisfy the following equation:

$W < D \times \pi$ ($D$:winding inner diameter,$\pi$:circular constant).

17. The method for manufacturing a cable-type secondary battery according to claim 15,
wherein in the step (a), the winding core having an oval section is disposed, and
wherein the widths (W) of the first electrode member and the second electrode member respectively satisfy the following equation:

$W < L$ ($L$:winding circumference).

18. The method for manufacturing a cable-type secondary battery according to claim 15,
wherein when the separator ribbon is wound to overlap into two layers, the width (W) of the separator ribbon satisfies the following equation:

$W > 2D \times \pi$ ($D$:winding inner diameter,$\pi$:circular constant).

19. The method for manufacturing a cable-type secondary battery according to claim 15,
wherein the first electrode member has a width of 0.4 to 0.5 mm, the separator ribbon has a width of 7 mm or below, and the second electrode member has a width of 3 mm or below.

20. The method for manufacturing a cable-type secondary battery according to claim 19,
wherein in the step (c), the separator ribbon is twisted to overlap 50% or below of the entire width.

\* \* \* \* \*